Nov. 13, 1956   F. J. PERKO   2,770,491
DUMPING VEHICLE
Filed Oct. 23, 1950   2 Sheets-Sheet 1
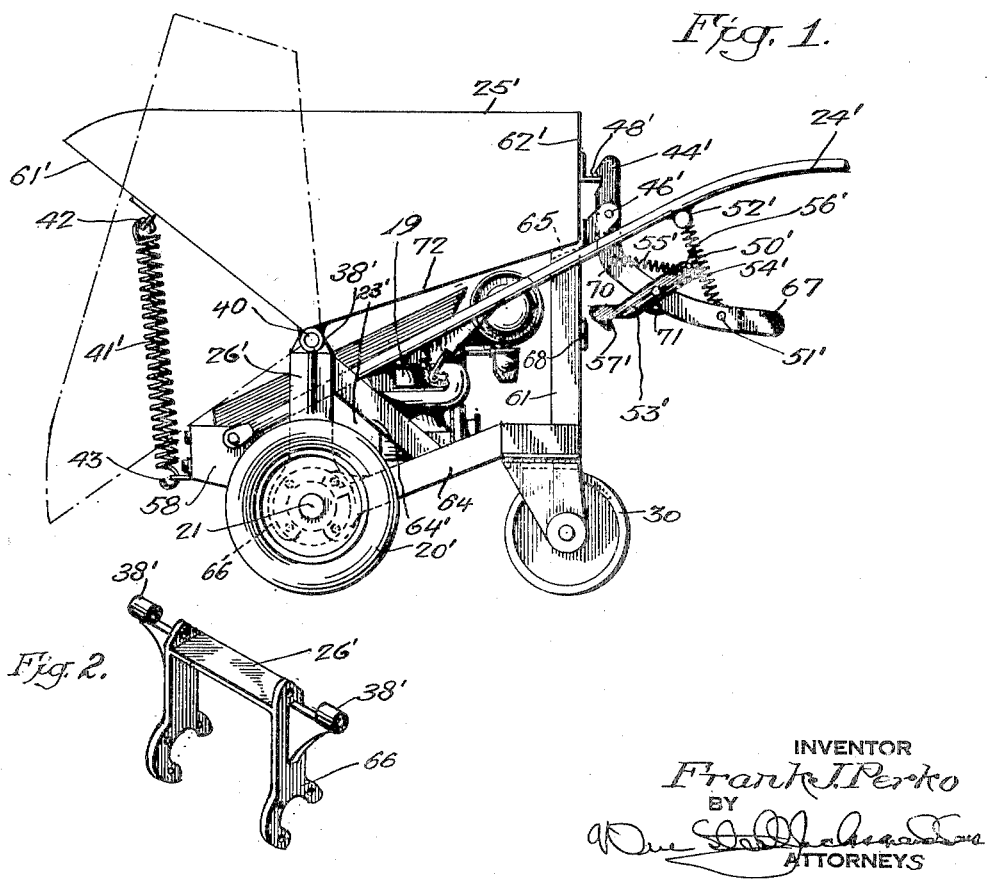
INVENTOR
Frank J. Perko
BY
ATTORNEYS Nov. 13, 1956 F. J. PERKO 2,770,491
DUMPING VEHICLE
Filed Oct. 23, 1950 2 Sheets-Sheet 2
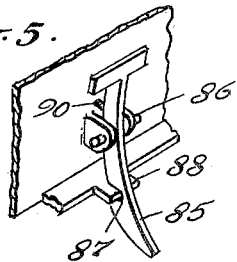
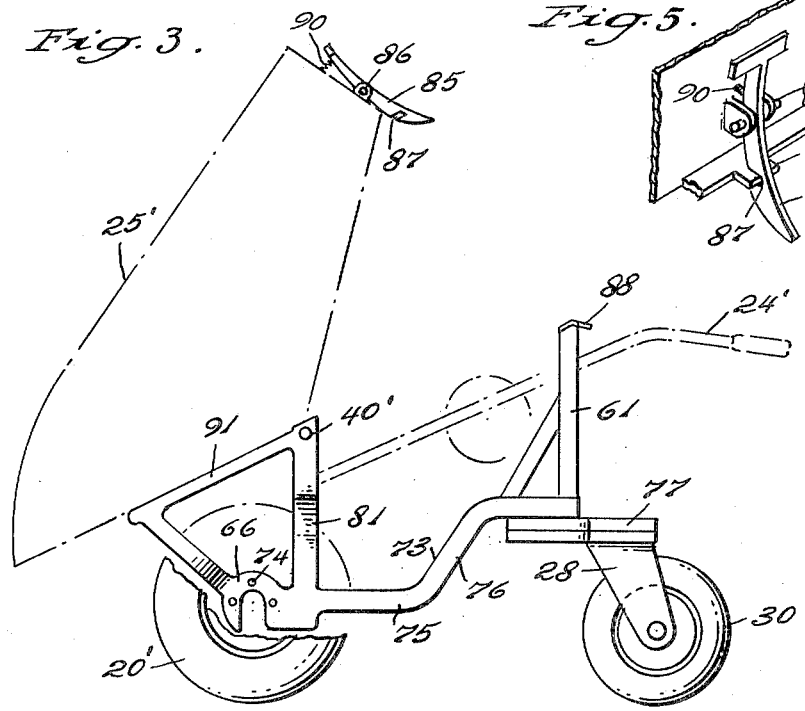
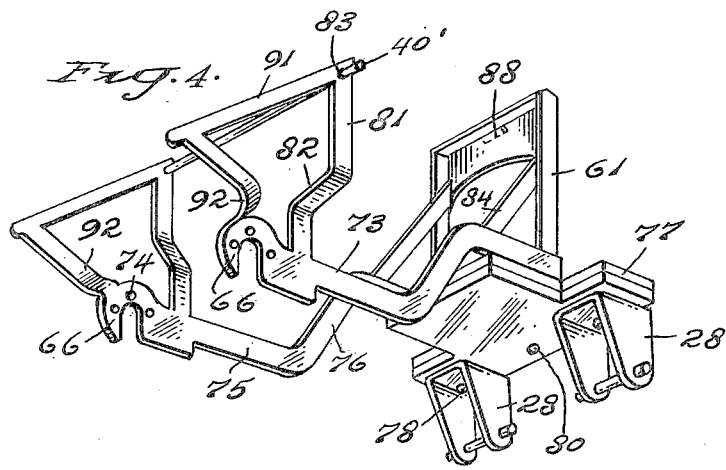
INVENTOR
Frank J. Perko.
BY
ATTORNEYS.

United States Patent Office 2,770,491
Patented Nov. 13, 1956

2,770,491

DUMPING VEHICLE

Frank J. Perko, Moscow, Pa.

Application October 23, 1950, Serial No. 191,576

5 Claims. (Cl. 298—10)

The present invention relates to earth moving vehicles, especially suited for employment on turf.

An object of the invention is to incorporate a frame carrying a dumping pivot, a body rest, and a latch on a self-propelled vehicle, and to pivotally mount a material moving body on the dumping pivot in position to be engaged by the latch.

Another object of the invention is to bias the material handling body away from the dumping position by overbalancing the load backwardly and desirably to spring urge the body toward dumping, and to latch the body in travelling position.

Yet another object of the invention is to secure a removable auxiliary frame to a self-propelled vehicle by backing the vehicle into engagement with the frame and securing the frame to the vehicle.

Still another object of the invention is to provide a vehicular frame having side bars which carry attachments to the vehicle at one end, free from permanent cross connection at that end, with cross connection at the opposite end, a wheel or wheels under the cross connection, a rest extending above the cross connection to support the body in travelling position, trunnion supports extending above the side bars at the end remote from the cross connection and a removable trunnion pivot extending through the trunnion supports.

A still further object of the invention is to provide wings on the side bars which extend suitably downwardly and inwardly in the forward direction from the trunnion supports and engage and support the body in dumping position.

With these and other objects in view, which may be incident to my improvements, the invention consists in the parts and combinations to be hereinafter set forth and claimed, with the understanding that the several necessary elements comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful application to the particular constructions, which for the purpose of explanation, have been made the subject of illustration.

In the drawings:

Figure 1 is a side elevational view of a self-propelled vehicle of the present invention, incorporating motor driving means and a pivoted dump body, showing the body in traveling position in solid lines and in dumping position in dot-and-dash lines;

Fig. 2 is a detailed perspective view of the dump body-mounting frame shown in Fig. 1;

Fig. 3 is a partially diagrammatic side elevational view of a modified form of dumping vehicle, the prime mover being partially broken away to show the auxiliary frame, and the prime mover and body being partially skeletonized;

Fig. 4 is a perspective view of the auxiliary frame of Fig. 3, with the auxiliary wheels omitted; and Fig. 5 is a fragmentary perspective view of the latch arrangement employed with the vehicle shown in Fig. 3.

Difficulty has been encountered in moving earth, stones and brush on sod and other surfaces where local changes in contour are present as in rolling and hilly country. This is particularly true where the condition of the sod must be preserved and ruts cannot be tolerated, such as in cemeteries, on golf courses, playing fields and the like. For such surfaces tractor vehicles and those provided with grippers cannot be permitted. However, it is necessary to move heavy loads of earth, stone and other materials often on uneven ground and frequently in fresh earth, as adjoining graves and other earth moving operations.

The present invention is concerned with the movement of earth by a very light self-propelled vehicle which can move in slippery and other inclement weather over sod and up and down banks and other rolling grassy surfaces.

Referring to the drawings, and more particularly to Figs. 1 and 2, the vehicle comprises main driving wheels 20', mounted upon a suitable axle 21, and adapted to be driven by an engine or motor 19, supported on the axle by means of a main frame 23'. The axle 21 also supports an auxiliary frame 26', which is preferably of depending yoke formation, as shown. The main frame may be provided with a power take-off device 58, at the front portion thereof, as shown in Fig. 1.

At each side of the auxiliary frame lateral rearwardly and upwardly extending bars 64 are secured to the rear frame which supports the swivelling yokes having casters 30. Cross-braces to the auxiliary frame are provided at 64', and an upward extension 61 is provided from the auxiliary rear frame at the back, this extension being formed with an angular seat 65 at the top thereof, which seat is adapted to receive and support the rear of the material handling body 25'. The auxiliary frame 26' (Fig. 5) is formed with trunnions 38' adapted to receive a pivot shaft 40 associated with the body 25', immediately beneath the lowermost portion of the body when it is in the traveling position. The frame 26' is also provided with yoke members 66 adapted for mounting on the axle 21.

The body 25' is latched in the traveling position by means of a latch 44' pivotally mounted at 46, and having an accessible grip portion 67. The latch makes engagement in traveling position with a dog 48' on the back of the body, and is urged to the latching position by a tension spring 50', one end of which engages with an abutment 51' on the latch, and the other end of which is secured to a crossbar 52' mounted between the handles 24'. The latch member 44' may be held or restrained from the latching position by means of a finger 53', pivoted at 54', and having a recess 57' adapted to hook over a crossbar 68 at the rear of the auxiliary frame portion. The finger 53' is urged into latched release position by means of a tension spring 55' acting between an abutment 56' on the finger and abutment 70 on the latch. Detent 71 prevents the finger from moving beyond its operative position.

The center of gravity of the load and dump body, when the body is filled to the normal level, is slightly rearward of the trunnions, so as to bias the body toward travel position, and the load and the body are biased toward dumping by a spring which urges the body in the direction of its forward position. The body when emptied also has its center of gravity located rearwardly of the trunnions. After the load is dumped, the body, empty, and restored to traveling position, has a relatively heavy rearward portion and the spring is just sufficient to over-balance the body in the direction of the dumping position as the body moves back toward traveling position.

As shown in Fig. 1, the load carrying body 25' is aided in its movement to dumping position by means of the tension spring 41', having one end connected to an abutment 42, near the upper portion of the front of the body, the opposite end 43 of the spring being anchored in a cross-member of the main frame. It will be noted that the body 25', when in traveling position, has a gradually forwardly and upwardly sloping front wall 51 and a gradually rearwardly and upwardly sloping bottom wall 72, and a vertical rear wall 62'.

In assembling the dumping vehicle shown in Fig. 1, the auxiliary frame 26', together with its associated side bars 64, cross-braces 64', swivel yokes with casters 30, and vertical rest for support 61, may first be assembled and connected to form a unitary structure, preparatory to attaching the material handling body 25' thereto. The combined frame structure, that is to say, the auxiliary frame 26' and its after-frame components, may then be attached to the power unit body bringing the frame or the unit into suitable position for hooking the yoke ends 66 over the axle of the power unit, just inside the wheel housing. When so assembled, the guiding handles 24' extend upwardly between the vertical portions of yokes 66, and straddle the extension or rest member 61. Thereafterwards, the material handling body is pivotally mounted on the frame through the medium of trunnions 38' and the pivot shaft 40 which is operatively associated with the body member. Finally, the latch mechanism is assembled, and the tension spring 41' is connected between the body 25' and the main frame of the power unit.

Referring to Figs. 3 and 5, the auxiliary frame 73 is in the form of a unitary structure designed for easy coupling with the chassis of the power unit. In this form the yoke ends 66 are integral with the side bars 75', the side bars being free from permanent cross-connection at the ends adjoining the yoke, whereby the power unit can be brought into operative position with respect to the auxiliary frame, or removed therefrom, without difficulty. As will be seen in Fig. 4, the side bars are desirably bent upwardly at 76, and the ends remote from the yokes 66 of the bars are welded or otherwise secured to a cross-plate 77 which unites the side bars.

The auxiliary caster wheels 30, mounted on pivoted pivots 78, are positioned below the cross-connection. Two caster wheels are provided in the arrangement shown; however, a center opening 80 in the cross-connection is provided, so that one of the wheels can be removed and a single wheel pivoted at 80, if so desired.

At a suitable point, slightly rearward of the yokes 66, upwardly extending offset trunnion supports 81 are provided, the supports being desirably bent outwardly as at 82. These supports have trunnion pivot openings 23 near the top thereof, and a trunnion pin 40' extends through the opening. The dump body 25' (Fig. 3), pivots on this pin in the same fashion as with the pivot pin 40 of Fig. 1. The pin is adapted to be removed when the frame is connected to the chassis of a self-propelled vehicle, and is inserted as the dump body 25' is mounted on the frame.

A vertical rest 61, as shown, extends above the cross-plate 77 secured to the side bars, the rest being braced as at 84. The rest member 61 supports the back of the dump body in traveling position as shown in Fig. 1. A latch 85 is pivoted at 86 (Fig. 5) at the back of the dump body 25', and extends downwardly so that a latching opening 87 may make engagement with a keeper prong 88 attached to the rest member 61 (Fig. 3). The latch is desirably urged into latching position by means of a compression spring 90 acting between the ends of the latch remote from the latching recess and the dump body.

Suitably supported on the side bars and extending forwardly and desirably inwardly from the top of the trunnion supports 81 are wing members 91 which extend under and support the forward portion of the body in dumping position, as shown in Fig. 3. The wing members are of generally triangular shape and are bent at 92 to deflect them inwardly.

The arrangement shown in Figs. 3 to 5 operates in much the same fashion as the arrangement of Figs. 1 and 2, except that in Fig. 3 the spring 41' is omitted for the reason that the strength of the operator is adequate to overcome the slight over-balance of the load and body toward the travel position. It will of course be understood that a biasing spring to assist in dumping can be used if desired. The form shown in Fig. 3 also has the advantage that the dump body 25' is well supported in the dump position, the trunnions having been moved slightly back of the position about the vehicle axle, so as to increase stability of the dumping vehicle when moving down hill.

It will thus be seen that in applicant's improved dumping vehicle, the power drive is at the load bearing wheels on the vehicle where the power is needed, and not at the rear where only a pushing force can be applied to the chassis of the vehicle. Additionally, by reason of applicant's novel connecting arrangement between the power unit and the auxiliary frame used for supporting the material holding body, the frame may be easily attached to the axle of the power unit by hooking the yoke members over the axle. When so engaged, and with the material holding body loaded with earth or the like, tortional forces due to irregularity in the terrain are compensated and smoothed out by reason of the freedom of movement of the connection between the frame and the power unit.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

Having thus described my invention what I claim as new and desire to secure by Letters Patent is:

1. A hauling vehicle unit of the character described, including a self-propelled vehicle, having an axle and a pair of driving wheels mounted thereon, a material moving dump body-supporting frame adapted for detachable connection with the axle of the self-propelled vehicle, said frame comprising side bars having a cross connection at the ends remote from the vehicle axle, a rest for a material holding body extending upwardly from the cross-connection, trunnion supports extending vertically above the side bars, and having yoke members constructed and arranged to hook over the axle of the self-propelled vehicle, at least one swivel wheel mounted below the cross member, and a material holding body supported on the trunnion supports by a pivotal mounting, said body resting in traveling position on the rest and being movable to dumping position by rotation about said pivotal mounting.

2. A hauling vehicle unit of the character described, including a self-propelled vehicle having an axle and a pair of driven wheels and associated housings mounted thereon, a material moving dump body-supporting frame adapted for detachable connection with the axle of the self-propelled vehicle, comprising a pair of side bars, each of said bars having a yoke member at one end thereof, said yoke members being constructed and arranged to hook over the axle, between the wheel housings, of the self-propelled vehicle, a cross connection at the opposite ends of the side bars, a wheel swivelly mounted below the cross connection, trunnion supports extending vertically above the side bars at the yoke ends thereof, and wing members on the side bars extending forwardly and downwardly of the trunnion supports, and adapted to support a material holding body in dumping position.

3. A hauling vehicle unit of the character described, including a self-propelled vehicle having an axle and a pair of driven wheels and associated housings mounted thereon, a material moving dump body-supporting frame adapted for detachable connection with the axle of the self-propelled vehicle, comprising a pair of side bars, each of said bars having a yoke member at one end thereof, said yoke members being constructed and arranged to hook over the axle, between the wheel housings, of the self-propelled vehicle, a cross connection at the opposite ends of the side bars, a wheel swivelly mounted below the cross connection, trunnion supports extending vertically above the side bars at the yoke ends thereof, wing members on the side bars extending forwardly and downwardly of the trunnion supports, a material holding body pivotally journalled on the trunnion supports, and latch means to hold said body in traveling position with respect to the frame.

4. A hauling vehicle unit of the character described, including a self-propelled vehicle having an axle and a pair of driven wheels and associated housings mounted thereon, a material moving dump body-supporting frame adapted for detachable connection with the axle of the self-propelled vehicle, comprising a pair of side bars, each of said bars having a yoke member at one end thereof, said yoke members being constructed and arranged to hook over the axle, between the wheel housings, of the self-propelled vehicle, a cross connection at the opposite ends of the side bars, a rest for a material handling body extending upwardly above the cross connection, a wheel swivelly mounted below the cross connection, trunnion supports extending vertically above the side bars at the yoke ends thereof, wing members on the side bars extending forwardly and downwardly of the trunnion supports, a material handling body mounted in the trunnions, said material handling body resting on said rest in traveling position, and latch means to secure said body to the rest.

5. A hauling vehicle unit of the character described, including a self-propelled vehicle having an axle and a pair of driven wheels and associated housings mounted thereon, a unitary material dump body-supporting frame comprising a pair of side bars, each of said bars having a yoke member at one end thereof, said yoke members being constructed and arranged to hook over the axle of the self-propelled vehicle, a cross connection at the opposite ends of the side bars, a rest for a material hauling body extending upwardly from the cross connection, trunnion supports extending vertically above the side bars at the yoke ends thereof, a swivel wheel mounted below the cross connection, wing members on the side bars and extending forwardly with respect to the trunnion supports, and a material holding body pivotally mounted on the trunnion supports, said body resting in traveling position on the rest and resting in dumping position on the wings.

References Cited in the file of this patent

UNITED STATES PATENTS

| | | |
|---|---|---|
| 1,358,235 | Nylin | Nov. 9, 1920 |
| 1,432,487 | Nester | Oct. 17, 1922 |
| 1,466,787 | Bull | Sept. 4, 1923 |
| 1,484,327 | Heil | Feb. 19, 1924 |
| 1,542,877 | Harman | June 23, 1925 |
| 1,742,735 | Strippel | Jan. 7, 1930 |
| 2,287,133 | Reiter | June 23, 1942 |
| 2,326,739 | Andrews | Aug. 17, 1943 |
| 2,533,549 | Bell | Dec. 12, 1950 |
| 2,590,285 | Wiltshire | Mar. 25, 1952 |

FOREIGN PATENTS

| | | |
|---|---|---|
| 178,922 | Great Britain | 1922 |
| 181,967 | Great Britain | 1922 |
| 242,458 | Great Britain | 1925 |
| 475,161 | Great Britain | Nov. 11, 1937 |
| 544,065 | Great Britain | Mar. 26, 1942 |